(12) United States Patent
Cobianu et al.

(10) Patent No.: US 7,243,547 B2
(45) Date of Patent: Jul. 17, 2007

(54) MEMS SAW SENSOR

(75) Inventors: Cornel P. Cobianu, Bucharest (RO);
Ioan Pavelescu, Bucharest (RO);
James D. Cook, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 134 days.

(21) Appl. No.: 10/964,519

(22) Filed: Oct. 13, 2004

(65) Prior Publication Data

US 2006/0075820 A1   Apr. 13, 2006

(51) Int. Cl.
*H02N 2/00* (2006.01)
(52) U.S. Cl. .............. 73/579; 310/313 B; 310/313 D; 73/702
(58) Field of Classification Search .......... 73/579, 73/702; 310/313 R, 313 B, 313 D
See application file for complete search history.

(56) References Cited

U.S. PATENT DOCUMENTS

| 4,100,811 | A | 7/1978 | Cullen et al. |
| 4,295,102 | A | 10/1981 | Schmidt et al. |
| 6,003,378 | A | 12/1999 | Scherr et al. |
| 2003/0005759 | A1 | 1/2003 | Breed et al. |
| 2005/0056098 | A1* | 3/2005 | Solie ........................ 73/702 |
| 2005/0062364 | A1* | 3/2005 | Van Der Knokke .... 310/313 D |

FOREIGN PATENT DOCUMENTS

| DE | 10215834 | | 6/2003 |
| DE | 10215834 | A1 * | 11/2003 |
| WO | WO 0220287 | | 3/2002 |
| WO | WO 0231461 | | 4/2002 |
| WO | WO 2003078950 | A1 * | 9/2003 |
| WO | WO 03081195 | | 10/2003 |

OTHER PUBLICATIONS

Reindl, et al., "Theory and Application of Passive SAW Radio Transponders as Sensors," IEEE Transacations on Ultraosnics, Ferroelectrics, and Frequency Control, vol. 45, No. 5, pp. 1281-1292, Sep. 1998.*
Tiersten, et al., "An Analysis of the Normal Acceleration Sensitivity of ST-Cut Quartz Surface Wave Resonators Rigidly supported Along the Edges", 41st Annual Frequency Control Symposium, pp. 282-288, 1987.*
Buff, et al., "Passive Remote Sensing for Temperature and Pressure Using SAW Resonator Devices," IEEE Transactions on Ultrasonics, Ferroelectrics, and Frequency Control vol. 45, No. 5, pp. 1388-1392 Sep. 1998.

(Continued)

*Primary Examiner*—Hezron Williams
*Assistant Examiner*—Rose M. Miller
(74) *Attorney, Agent, or Firm*—Kris T. Fredrick

(57) ABSTRACT

Devices and methods for acoustically measuring temperature and pressure are disclosed. An illustrative SAW sensor can include an electrode structure that transmits and receives surface acoustic waves along a SAW delay line, a temperature sensor for measuring temperature along a first direction of the SAW delay line, and a pressure sensor for measuring pressure along a second direction of the SAW delay line. The SAW sensor can include an antenna that wirelessly transmits and receives RF signals to and from an electrical interrogator unit that can be used to power the SAW sensor.

59 Claims, 9 Drawing Sheets

OTHER PUBLICATIONS

Benes et al., "Comparison between BAW and SAW Sensor Principles," IEEE International Frequency Control Symposium, pp. 5-20, 1997.

Schimetta et al., "Optimized Design and Fabrication of a Wireless Pressure and Temperature Sensor Unit Based on SAW Transponder Technology," IEEE MTT-S International Microwave Symposium Digest, pp. 355-358, 2001.

Reindl et al., "SAW Devices as Wireless Passive Sensors," IEEE Ultrasonics Symposium, pp. 363-367, 1996.

Scherr et al., "Quartz Pressure Sensor Based on SAW Reflective Delay Line," IEEE Ultrasonics Symposium, pp. 347-350, 1996.

Scholl et al., "Wireless Passive SAW Sensor Systems For Industrial and Domestic Applications," IEEE International Frequency Control Symposium, pp. 595-601, 1998.

\* cited by examiner

MEMS SAW SENSOR

FIELD

The present invention relates generally to the field of acoustic sensors. More specifically, the present invention pertains to microelectromechanical (MEMS) surface acoustic wave (SAW) sensors for measuring temperature and pressure.

BACKGROUND

Surface acoustic wave (SAW) sensors are employed in a wide variety of applications for sensing one or more parameters within an environment. In the automotive industry, for example, such devices have been used to monitor tire pressure and temperature, and to detect finger pressure in keyless entry systems. Because SAW sensors are typically fabricated using photolithographic techniques similar to that used in the semiconductor industry, such devices can be made reliably, making them desirable in those applications demanding a high level of precision and low cost. Other factors such as high sensitivity, low noise, size, and imperviousness to many environmental factors also make SAW sensors desirable in many applications.

More recent trends in the art have focused on the fabrication of wireless and passive MEMS SAW sensors. In contrast to more traditional, active sensors that rely on the use of a battery or capacitor as a power source, wireless and passive MEMS SAW devices are useful in those applications where the harsh environment may prevent the presence of a human operator, or where the presence of wires and/or a power supply may be inappropriate. In the chemical industry, for example, such wireless and passive SAW sensors can be used for extended periods of time to sense pressure, temperature, the existence of chemicals, or other desired parameters in harsh environments where gasses or chemicals may prevent human interaction. In medical applications, such wireless and passive SAW sensors can be used to non-invasively (e.g. using liquid-sensitive acoustic modes) monitor glucose or other desired fluids within the body for relatively long periods of time without the need for replacing batteries.

SUMMARY

The present invention pertains to SAW sensors for differentially measuring both temperature and pressure. A SAW sensor in accordance with an illustrative embodiment of the present invention can include an electrode structure operatively coupled to a piezoelectric substrate, temperature-sensing means for measuring the temperature within the environment, and pressure-sensing means for measuring the pressure within the environment. The electrode structure can include an interdigital transducer having a number of inter-digitated electrodes that, when excited with an RF interrogation signal from an electrical interrogator unit, can be used to transmit a surface acoustic wave along a SAW delay line of the sensor.

A number of temperature sensing reflectors can be provided at various positions and orientations along the acoustic path of the SAW delay line, providing a means for differentially measuring the temperature above the top surface of the substrate by reflecting one or more echo signals back to the interdigital transducer (IDT). In certain embodiments, for example, a measure of the temperature can be determined using a phase response function that is a linear combination of the phase differences of the echo signals returned by the various temperature sensing reflectors. A reference reflector for temperature measurement located orthogonal to the x direction and in a stress-free region of the substrate may be provided for a robust, differential measurement. In general, the phase response of the reflector is affected by the phase velocity of the acoustical wave, the temperature coefficient of the reflector, and the relative position of the reflector to the IDT.

A number of pressure sensing reflectors can be further provided along the acoustic path of the SAW delay line as a means to differentially measure pressure above the top surface of the substrate. The pressure sensing reflectors can be coupled to a diaphragm adapted to displace and strain in response to external pressure exerted thereon by the surrounding environment. The pressure sensing reflectors can be positioned on an outer (i.e. compressive) region of the diaphragm, which typically has a greater phase velocity than the inner (i.e. stretched) region of the diaphragm, increasing the sensitivity of the SAW sensor to measure differences between the radial and tangential stresses induced on the diaphragm as it displaces. During operation, surface acoustic waves transmitted by the electrode structure propagate along the SAW delay line across the surface of the diaphragm and the pressure sensing reflectors. The pressure can then be measured by differentially combining the phase responses of the different pressure sensing reflectors exposed to different strains. As with the case of temperature measurement, a reference reflector located on a stress-free region of the substrate can also be provided for pressure measurement. In some cases, the reference reflector can be the same reflector that is used for differential temperature measurement.

The SAW sensor may include an antenna or other means for wirelessly transmitting echo signals returned from the various pressure and temperature reflectors. The SAW sensor can be configured to transmit an RF response signal to the interrogator unit, which can then be analyzed by the interrogator unit and/or a controller/processor to determine the pressure and/or temperature within the surrounding environment. In certain embodiments, the SAW sensor may further include tagging means for identifying the SAW sensor, allowing the interrogator and/or controller/processor to associate the RF response signal received with a particular sensor. In one illustrative embodiment, for example, two identification reflectors can be provided along the acoustic path of the SAW delay line, which, when struck with incident surface acoustic waves, can be configured to reflect echo signals that can be used in uniquely identifying the SAW sensor.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction and materials are illustrated for the various elements, those skilled in the art will recognize that many of the examples provided have suitable alternatives that may be utilized.

Figures 1, 2:
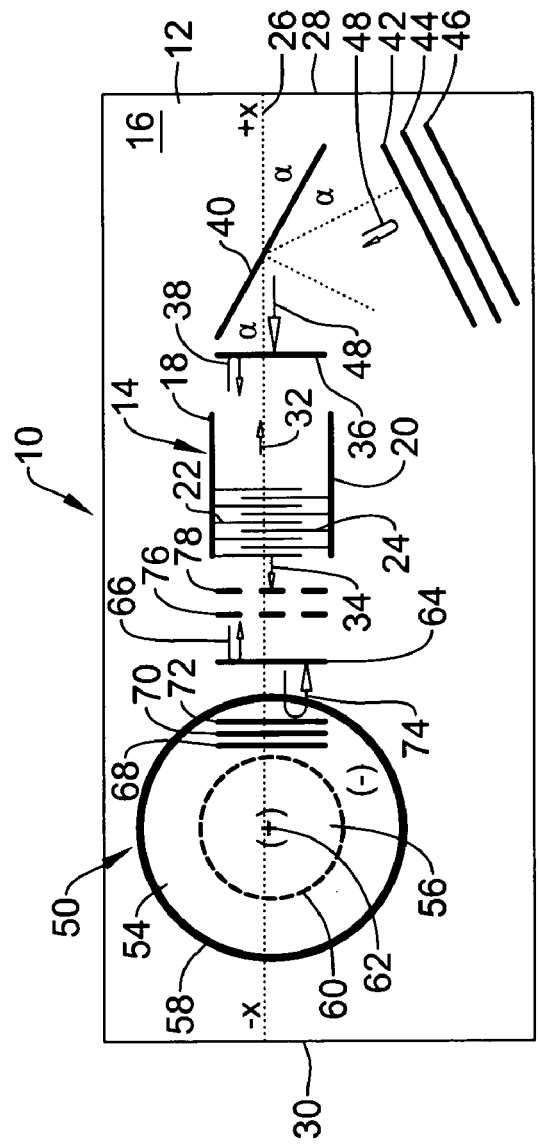
FIG. 1 is a top schematic view of a MEMS SAW sensor in accordance with an illustrative embodiment of the present invention employing a single SAW delay line.
FIG. 2 is a side interior view of the MEMS SAW sensor of FIG. 1.

FIG. 1 is a top schematic view of a MEMS SAW sensor 10 in accordance with an illustrative embodiment of the present invention employing a single SAW delay line. SAW sensor 10 includes an underlying substrate 12 adapted to support a number of components that can be used to determine both the temperature and pressure of the surrounding environment. The substrate 12 may be formed from a suitable piezoelectric material such as quartz (single crystal $SiO_2$), lithium niobate ($LiNbO_3$), gallium arsenide (GaAs), bio-inert ceramics (e.g. alumina), and/or polymeric piezoelectric materials (e.g. polyvinylidenefluoride (PVDF) film), whose properties can be exploited to convert electromagnetic energy into acoustical energy and vice versa via the piezoelectric effect.

A uniform interdigital transducer (IDT) 14 can be provided above the top surface 16 of the substrate 12. The IDT 14 can include two parallel combs 18,20 defining, respectively, a first number of linear metal electrodes 22 and a second number of linear metal electrodes 24 that are interspaced with each other. The first and second number of electrodes 22,24 may be oriented lengthwise in a direction 26 orthogonal to a single SAW delay line of the SAW sensor 10, which as is indicated by the dashed lines in FIG. 1, extends across the top surface 16 of the substrate 12 from a first end 28 of the substrate 12 to a second end 30 thereof. The combs 18,20 containing electrodes 22,24 may be formed using a suitable process such as depositing (e.g. e-gun evaporation, sputtering, laser ablation) metal over the top surface 16, although other fabrication techniques are possible. Examples of suitable materials that can be used to form the combs 18,20 containing the electrodes 22,24 may include, but are not limited to, aluminum (Al), platinum (Pt), gold (Au), rhodium (Rh), iridium (Ir), copper (Cu), titanium (Ti), tungsten (W), chromium (Cr), nickel (Ni), or combinations and/or alloys thereof.

In the illustrative embodiment of FIG. 1, the IDT 14 can be configured to produce surface acoustical waves that propagate bi-directionally in both a +x direction and a −x direction along the top surface 16 of the substrate 12. As indicated generally by arrow 32 in FIG. 1, for example, the IDT 14, when excited by an electrical signal, can be configured to generate and transmit a first incident surface acoustic wave in the +x direction along the SAW delay line 26 that can be utilized to sense temperature above the top surface 16 of the substrate 12. In addition, the IDT 14 can be configured to simultaneously generate and transmit a second incident surface acoustic wave 34 in the −x direction along the SAW delay line 26 that can be utilized to measure pressure above the top surface 16 of the substrate 12. In certain embodiments, the IDT 14 can be formed on a stress-free region of the top surface 16.

To measure temperature within the surrounding environment, a number of temperature reflectors may be formed on the top surface 16 of the substrate 12. In the illustrative embodiment of FIG. 1, for example, a temperature reflector 36 oriented lengthwise in a direction 26 orthogonal to the SAW delay line can be provided as a reference reflector located on a stress-free region of the substrate 12, producing an echo signal 38 having a phase response affected only by the phase velocity, the temperature coefficient of the phase velocity, the relative position of the reflector 36 to the IDT 14 in the +x direction, and the thermal expansion coefficient in the +x direction. As can be seen in the side interior view depicted in FIG. 2, the reference temperature reflector 36 can comprise a structure extending upwardly from the top surface 16, and can be located at a stress-free region of the substrate 12 to permit temperature sensing that is not affected by any mechanical stress.

A deflector 40 with a high reflection coefficient and oriented lengthwise at an angle $\alpha$ from the SAW delay line 26 can be configured to deflect the incident surface acoustic wave 32 by a factor of $2\alpha$, directing the first incident surface acoustic wave 32 in a different direction, with a different temperature coefficient of phase velocity (due to quartz anisotropy) sufficient to measure temperature-induced phase response in the reflected echo signal. The angle $\alpha$ at which the deflector 40 is oriented with respect to SAW delay line 26 may vary depending on the type of substrate material employed as well as other factors. In those embodiments employing a quart substrate 12 made of ST quartz, for example, an angle $\alpha$ of about 7° to 11° (i.e. $14° \leq 2\alpha \leq 22°$) will typically be sufficient to deflect the incident surface acoustic wave 32 in a different direction such that the temperature coefficient of phase velocity and the reflection coefficient of the SAW sensor 10 can be exploited to measure temperature. It should be understood, however, that the angle $\alpha$ can be made greater or lesser for use with other types substrate materials, if desired.

Once the incident surface acoustic wave 32 is deflected via the deflector 40, the wave is then reflected against a number of temperature sensing reflectors 42,44,46, each of which can be configured to produce an echo signal 48 that is then returned back to the IDT 14 along the same general path as the incident surface acoustic wave 32. Due to quartz anisotropy, the echo signal 48 returned by each of the temperature sensing reflectors 36,42,44,46 may vary from each other based the temperature coefficient of phase velocity and the reflection coefficient of the SAW sensor 10 in the +x direction as the incident surface acoustic wave 32 is deflected against the deflector 40, causing the deflected wave to propagate at different directions. A measure of temperature can then be determined using a phase response function that is a linear combination of the differences of phase response of the echo signals 48 returned from each of the temperature sensing reflectors 36,42,44,46.

While three temperature reflectors 42,44,46 are depicted in the illustrative embodiment of FIG. 1, it should be understood that a greater or lesser number of temperature sensing reflectors can be employed, if desired. In certain embodiments, a minimum number of temperature reflectors can be employed to reduce the SAW chip size as well as reduce the complexity of the interrogation electronics. In one illustrative embodiment, for example, temperature can be measured by considering a difference of the phase responses of two reflectors (e.g. reflectors 36 and 42) located in their respective positions, and having numerical coefficients in front of the their phase responses, such that the effect of path difference between the two reflectors on the differential phase responses is eliminated. In other embodiments, however, the linearity and sensitivity characteristics of the differential temperature measurement can be increased by the use of more reflectors, if desired. In the illustrative embodiment depicted in FIG. 1, for example, five reflectors 36,40,42,44,4 are shown on the top surface 16 of the substrate 12 to create a more complex and robust differential transfer function.

To measure pressure within the surrounding environment, a diaphragm 50 disposed along the −x direction of the SAW delay line 26 can be formed in the top surface 16 of the substrate 12. In certain embodiments, and as shown in the side interior view of FIG. 2, the diaphragm 50 may be formed by etching a cavity 52 within the substrate 12, leaving intact a thinned portion of the substrate 12 extending a distance h below the top surface 16. In certain embodiments, etching of the diaphragm 50 can be accomplished using photolithography techniques and a suitable wet or dry etchant adapted to selectively etch the substrate material. Other techniques such as grinding away the substrate material can also be used to form the cavity 52, if desired.

As can be further seen by reference to FIG. 1, the diaphragm 50 may include a compressive region 54 and a stretched region 56. The compressive region 54 may include an outer, annular-shaped region extend inwardly from an outer periphery 58 of the diaphragm 50 to an imaginary circle 60 disposed within the interior of the diaphragm 50. The stretched region 56 of the diaphragm 50, in turn, may form an interior, circular-shaped region extending inwardly from the imaginary circle 60 to the center 62 of the diaphragm 50.

A reference pressure reflector 64 oriented lengthwise in a direction orthogonal to the SAW delay line axis 26 can be provided on a stress-free region of the top surface 16 of the substrate 12, and can be configured for use as a pressure reference, producing an echo signal 66 having a phase response affected only by the phase velocity, the temperature coefficient of the phase velocity, and the relative distance of the reflector 64 to the IDT 14 of the SAW sensor 10 in the −x direction. As illustrated in FIG. 1, the reference pressure reflector 64 can be located a sufficient distance away from the diaphragm 50 such that the echo signal 66 produced by the reference pressure reflector 64 is not significantly affected by strain and displacement of the diaphragm 50.

A number of pressure sensing reflectors 68,70,72 located on the compressive region 54 of the diaphragm 50 can be used to measure pressure within the surrounding environment adjacent the diaphragm 50. As the incidence surface acoustic wave 34 wave transmitted by the IDT 14 is deflected against the pressure sensing reflectors 68,70,72, a number of echo signals 74 are produced, each having a phase velocity representative of the sign (i.e. + or −) and strain on the diaphragm 50. The phases of the echo signals 74 will typically have a well-defined fingerprint based on the strain on the diaphragm surface, which tends to influence the phase responses of the reflected echo signals 74. A measure of the pressure can then be determined by differentially combining the phase responses of the different pressure sensing reflectors 68,70,72 exposed to different strains together with the phase response of the reference reflector 64. Such differential measurement can be used, for example, to provide a temperature-compensated pressure value since the effect of thermal deformation of acoustic path on the phase-shifted echo signals 74 can be cancelled by the appropriate selection of coefficients in the final transfer function of phase response. As in the case of differential temperature measurement, an increased number of reflectors can be utilized to increase the linearity and sensitivity of the pressure measurement, if desired.

In certain embodiments, the SAW sensor 10 may further include tagging means for uniquely identifying the SAW sensor 10. In the illustrative embodiment of FIG. 1, for example, a set of two identifier reflectors 76,78 are shown provided above the top surface 16 of the substrate 12 along the acoustic path of the SAW delay line 26 in the −x direction. During operation, these identifier reflectors 76,78 can be used to reflect unique echo signals back to the IDT 14, providing an acoustic signature that can be used to identify the SAW sensor 10 from other sensors within a system. While only two identifier reflectors 76,78 are depicted in the illustrative embodiment of FIG. 1, it should be understood that the number of the identifier reflectors 76,78 can be increased to permit a greater number of SAW sensors to be identified, if desired. Conversely, a single identifier reflector can be provided if a lesser number of SAW sensors are to be identified. In some embodiments, the ID tagging of the SAW sensor can be performed at the interrogation electronics level and/or system software level, although other configurations are possible.

Figure 3:
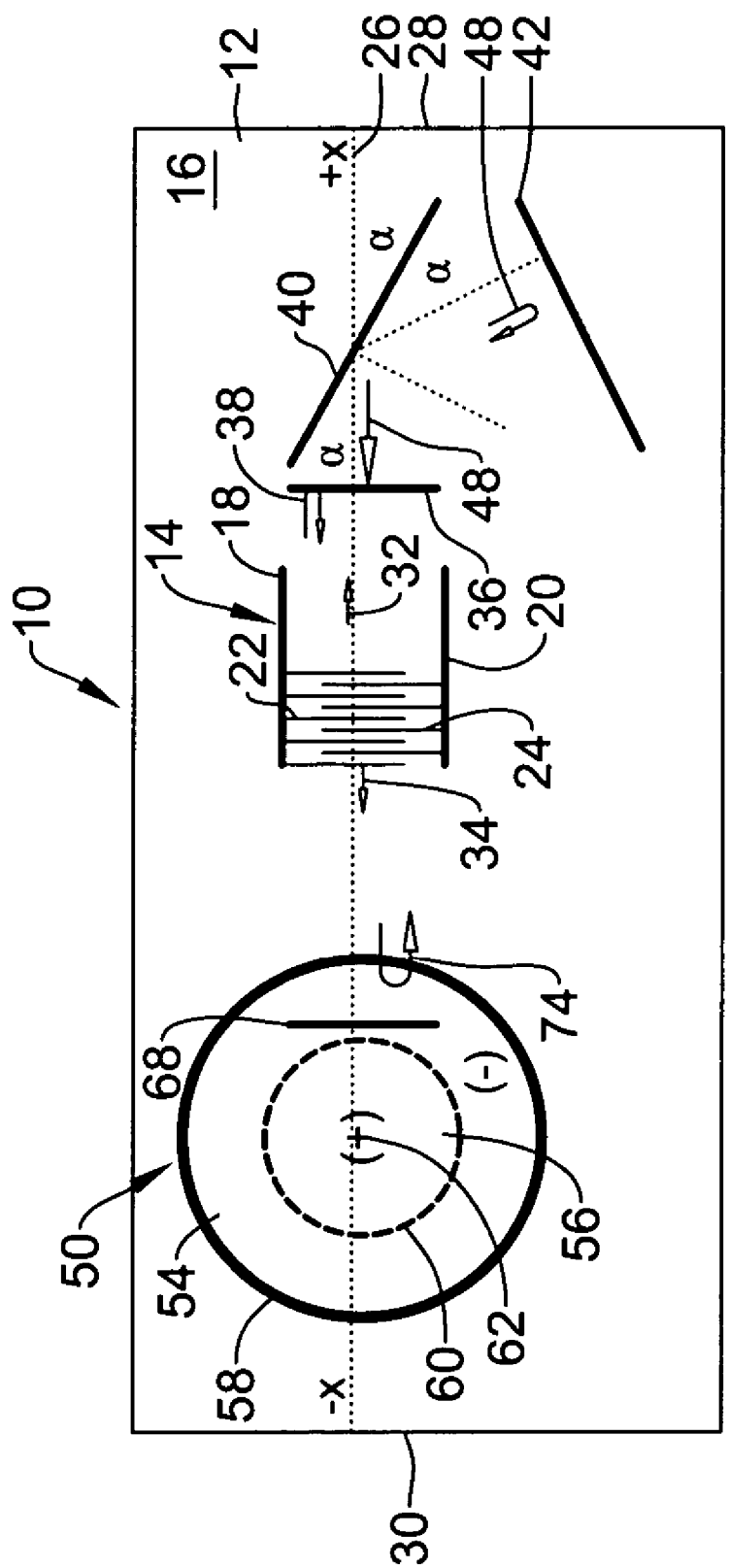
FIG. 3 is a top schematic view showing the illustrative MEMS SAW sensor of FIG. 1 employing a minimum number of reflectors for differentially measuring temperature and pressure.

FIG. 3 is a top schematic view showing the illustrative MEMS SAW sensor 10 of FIG. 1 employing a minimum number of reflectors for the purpose of reducing SAW chip size and the complexity of the interrogation electronics. As shown in FIG. 3, reflectors 64, 44, 46, 64, 70, 72, 76, and 78 are shown removed from the top surface 16 of the substrate 12, leaving thereon a minimum number of reflectors 40, 42, and 48 to permit both differential temperature and pressure measurements.

In the illustrative embodiment of FIG. 3, reflector 48 can be configured to act as the reference reflector for both temperature and pressure differential measurements. For differential temperature measurement, reflectors 38 and 42 can be used in a manner similar to that described above, with reflector 40 being configured to deflect most of the incident SAW wave. For differential pressure measurement, in turn, reflectors 48 and 68 can be used. To permit differential pressure measurement, the distance from the IDT 14 to the reflector 68 should be approximately the same as the distance from the IDT 14 to the position where reflector 64 was located in FIG. 1. In the embodiment of FIG. 3, however, the reference electrode function is replaced by reflector 38 due to the ability of the IDT 14 to generate and transmit identical SAW waves in both the +x and −x direction. It should be understood, however, that the location of the pressure reflector 68 and temperature reflector 42 can be selected such that the transfer function for differential pressure measurement (YP) is sensitive only to variation of the phase velocity to the strain created by the external pressure on the diaphragm 50.

Similarly, the transfer function for the differential temperature measurement (YT) can be made sensitive only to the variation of phase velocity to the temperature, which has different temperature coefficients in different directions. In order to have the transfer functions YP,YT, each related as much as possible to only pressure or temperature, respectively the contribution to the length of the total acoustic path (and its temperature dependence) to the phase response of each echo signal can be cancelled by the proper selection of numerical coefficients that multiplies the value of one of the phase responses.

The SAW sensor 10 can be packaged using standard fabrication processes and quartz processing techniques used in the art. In certain embodiments, for example, the SAW sensor 10 can be fabricated using bulk micro-micromachining techniques commonly used in the semiconductor industry (e.g. photolithography, etching, layer deposition, etc.), allowing multiple sensors to be fabricated on a single wafer substrate and with a high degree of precision. In some embodiments, a quartz lid or other means for hermetically sealing the package can be provided in order to protect the SAW sensor 10 from chemicals, radiation, shock, or other environmental factors. If desired, the lid can be used to form a pressure reference chamber adjacent the pressure sensing diaphragm 50.

The substrate 12 can be packaged in a manner to preserve a stress-free region in the vicinity of the various temperature reflectors and deflectors, and in the vicinity of the IDT 14, allowing the SAW sensor 10 to measure temperature across a wide range of values without calibration, provided the dispersion in the technological parameters for the fabrication of the SAW sensor 10 and diaphragm 50 is low. In certain embodiments, for example, such stress-free regions can be obtained by the proper selection of materials for the SAW sensor 10 packaging. In a packaging scheme involving an all quartz substrate material, for example, the quart-to-quartz bond can be accomplished by means of creating covalent Si—O—Si bonds between the two quartz wafers. A suitable metallization technology based on metal ion implantation in the quartz can then be used for buried metal connection from the SAW sensor 10 to outside bonding pads, if desired.

Figure 4:
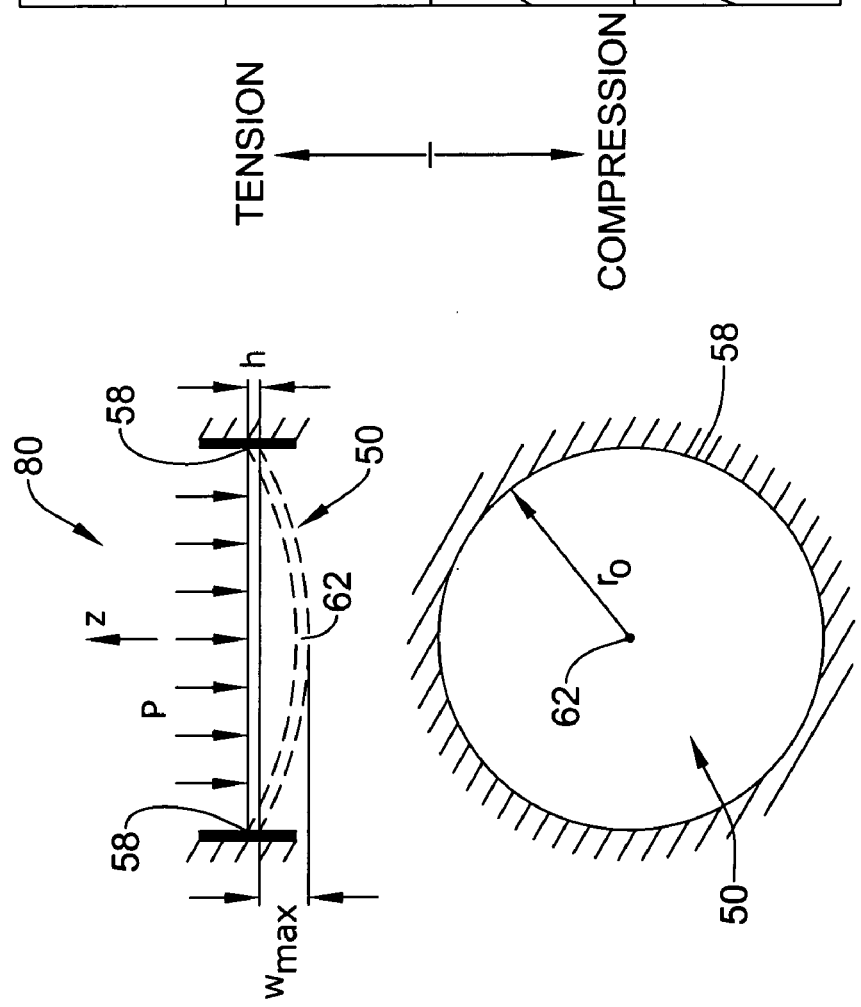
FIG. 4 is a load diagram showing the illustrative diaphragm of FIG. 1 in response to external pressure within the surrounding environment.

FIG. 4 is a load diagram 80 showing the illustrative diaphragm 50 of FIG. 1 in response to external pressure within the surrounding environment. As can be seen in FIG. 4, a uniform load or pressure P exerted on the diaphragm 50 from the surrounding environment causes the diaphragm 50 to displace in the −z direction in a manner indicated generally by the dashed lines. The diaphragm 50, which is fixedly supported at its outer periphery 58 to the substrate 12, displaces a maximum deflection of $w_{max}$ at or near the center 62 of the diaphragm 50, which is located a fixed distance $r_0$ away from the outer periphery 58. The maximum deflection $w_{max}$ in which the diaphragm 50 displaces is dependent in part on the magnitude of the pressure P, the thickness h of the diaphragm 50, and the material characteristics of the diaphragm material (e.g. the modulus of elasticity E, anisotropy, etc.). Other factors such as the thermal characteristics of the diaphragm material may also affect the deflection characteristics of the diaphragm 50 in certain cases.

Figure 5:
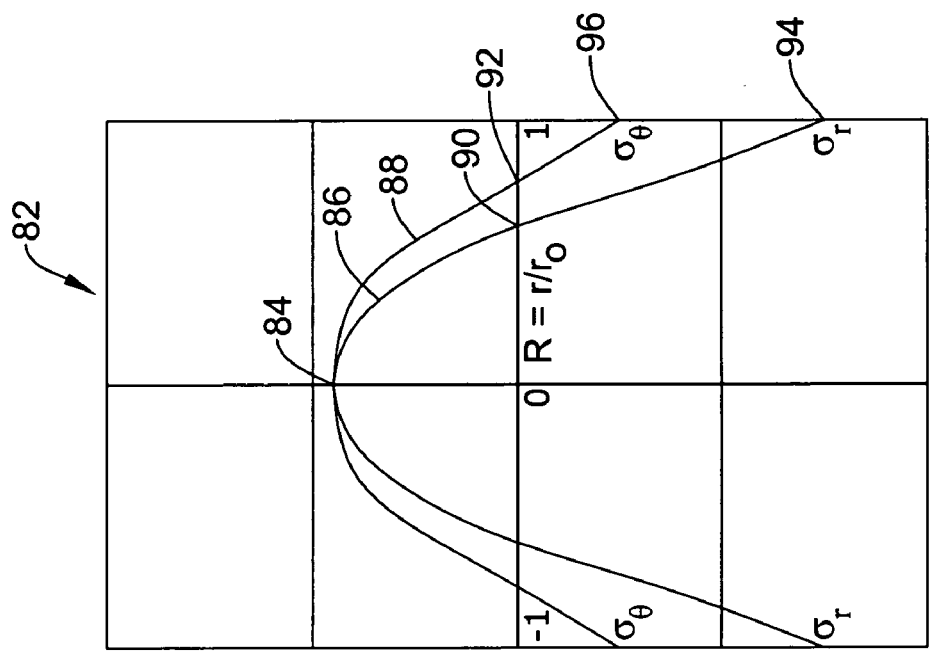
FIG. 5 is a graph showing the distribution of radial and tangential stresses on the diaphragm of FIG. 1 in response to the external pressure depicted in FIG. 4.

FIG. 5 is a graph 82 showing the distribution of both radial stress $\sigma_r$ and tangential stress $\sigma_\theta$ as a function of the normalized distance $R=r/r_0$ across the surface of the diaphragm 50 in response to the external pressure P depicted in FIG. 4. As can be seen in FIG. 5, the radial and tangential stresses $\sigma_r,\sigma_{74}$ are the same magnitude at point 84, which corresponds to the center 62 (i.e. $R=r/r_0=0$) of the diaphragm 50 where displacement $w_{max}$ is greatest. From point 84, the radial and tangential stresses $\sigma_r$, $\sigma_\theta$ each follow a separate stress curve 86 and 88, respectively, wherein the radial and tangential stresses $\sigma_r,\sigma_\theta$ transition from tension to compression towards the outer periphery 58 (i.e. $R=r/r_0=1$) of the diaphragm 50. The radial and tangential stress $\sigma_r,\sigma_\theta$ represented by the curves 86,88 can be determined generally from the following two formulas:

$$\sigma_r = \frac{3Pr_0^2}{8h^2}[(1+v)-(3+v)R^2] \quad (1)$$

$$\sigma_\theta = \frac{3Pr_0^2}{8h^2}[(1+v)-(1+3v)R^2] \quad (2)$$

where:
$\sigma_r$=the radial stress on the diaphragm,
$\sigma_\theta$=the tangential stress on the diaphragm,
P=the external pressure exerted on the diaphragm,
h=the diaphragm thickness,
$r_0$=the diaphragm radius, and
v=Poisson's ratio.

The points 90 and 92 along the curves 86,88, respectively, are the transition points from tension to compression for both radial stress $\sigma_r$ and tangential stress $\rho_\theta$. These points are derived from the above expressions, and are given by:

$$r_r=r_0\sqrt{(1+v)/(3+v)} \text{ for } \sigma_r=0, \text{ and} \quad (3)$$

$$r_\theta=r_0\sqrt{(1+v)/(1+3v)} \text{ for } \sigma_\theta=0. \quad (4)$$

As shown in FIGS. 1 and 3, an imaginary circle 60 is demarcated between the compressive region 54 and stretched region 56 of the diaphragm 50 at the point in which the condition $\sigma_r+\sigma_\theta$ is achieved (i.e. where $r_{transition}=(1/\sqrt{2})r_0$). At points 94 and 96 along the curves 86,88, at or near the outer periphery 58 of the diaphragm 50, the radial stress $\sigma_r$ and tangential stress $\sigma_\theta$ reach maximum compressive values. Due to the varying slope of the radial and tangential stress curves 86,88, however, the maximum compressive stress value for the radial stress $\sigma_r$ tends to be greater than the maximum compressive stress value for the tangential stress $\sigma_\theta$.

As can be further seen in FIG. 5, the difference between the radial and tangential stresses $\sigma_r,\sigma_\theta$ is also greatest at the outer periphery 58 of the diaphragm 50. This differential in compressive stress between the radial and tangential stress components at the outer periphery 58 of the diaphragm (i.e. at points 94 and 96) can be determined using the following formula:

$$\delta_{stress} = (\sigma_\theta - \sigma_r)\big|_{r=r_0} = \frac{3Pr_0^2}{4h^2}(1-v) \quad (5)$$

Because the sensitivity of the SAW sensor 10 to measure pressure tends to be the greatest at the location where the difference between the radial and tangential stresses $\sigma_r$, $\sigma_\theta$ is greatest (i.e. at points 94 and 96), the pressure sensing reflectors 68,70,72 should normally be placed on the compressive region 54 of the diaphragm 50 at or near the outer periphery 58. Such placement ensures that the radial stresses $\sigma_r$ induced as a result of pressure P exerted on the diaphragm 50 can be easily distinguished by the second incidence surface acoustic wave 34, thereby increasing the sensitivity of the SAW delay line 26. While the pressure sensing reflectors 68,70,72 will normally be placed on the compressive region 54 of the diaphragm 50, it should be understood, however, that one or more of the pressure sensing reflectors 68,70,72 can be positioned at other locations of the diaphragm 50, if desired. In certain alternative embodiments, for example, the pressure sensing reflectors 68,70,72 can be placed entirely on the stretched region 56 of the diaphragm 50, or on a combination of both the compressive and stretched regions 54,56.

Figure 6:
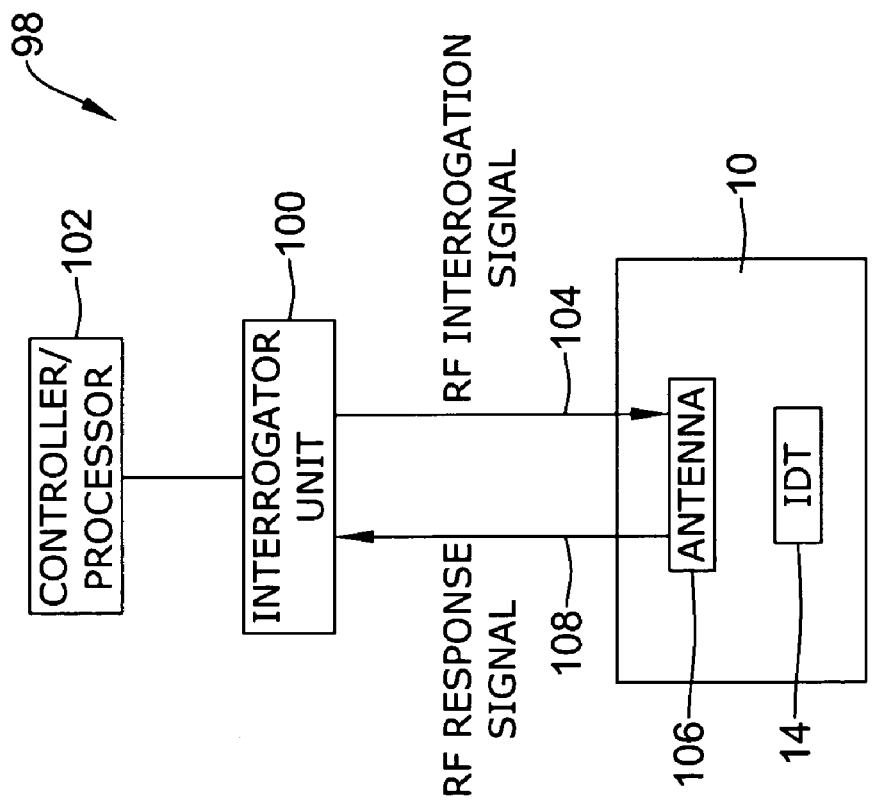
FIG. 6 is a block diagram showing the MEMS SAW sensor of FIG. 1 in communication with an interrogator unit and controller/processor.

FIG. 6 is a block diagram 98 showing the MEMS SAW sensor 10 of FIG. 1 in communication with an interrogator unit and controller/processor. As can be seen in FIG. 6, an electrical interrogation unit 100 operatively coupled to a controller/processor 102 can be configured to output an RF interrogation signal 104 to the SAW sensor 10, which is then converted into an acoustical signal via the IDT 14. The RF interrogation signal 104 outputted to the SAW sensor 10 can be either wired or wireless, the latter case allowing the SAW sensor 10 to be operated at remote locations without the need for additional wires or leads. In certain embodiments, for example the SAW sensor 10 may include an antenna 106 or other suitable element for wirelessly transmitting and receiving signals to and from the SAW sensor 10. The energy required to run the SAW sensor 10 is typically quite small, and can be obtained from electromagnetic waves in the RF interrogation signal 104, allowing the SAW sensor 10 to operate passively, if desired.

During operation, pulsed RF waves received by the antenna 106 via the RF interrogation signal 104 are transformed by the IDT 14 into surface acoustic waves using inverse piezoelectric principles. These surface acoustic waves are then returned as echo pulses, which can be sensed in a reverse fashion by the IDT 14 and then retransmitted as an RF response signal 108 back to the interrogator unit 100. The RF response signal 108 can include the information about the location and quantity of reflections as well as various propagation and reflection properties of the SAW sensor 10. The interrogator unit 100 and controller/processor 102 can then be used to evaluate the amplitude, phase, frequency and/or the time delay of the RF response signal 108 to determine the pressure and/or temperature surrounding the SAW sensor 10.

The propagation speed of the surface acoustic waves allows a relatively long delay time to be realized on the substrate 12, allowing the RF response signal 108 to be returned to the interrogator unit 100 after all environmental echoes have dissipated. Such configuration allows the interrogator unit 100 and controller/processor 102 to analyze the returned information from the SAW sensor 10 without substantial interference from reflections of electromagnetic signals. In certain embodiments, the positioning of the various temperature and pressure reflectors can be configured such that the different echo signals are received at the antenna 106 at different times, although other configurations are possible.

In those embodiments employing one or more identifier reflectors 76,78, the RF response signal 108 can also be configured to carry identification information that can be used to uniquely identify the SAW sensor among multiple SAW sensors, if desired. In some applications, it may also be desirable to determine the location of the SAW sensor 10 relative to the interrogator unit 100. Such information may be used, for example, in determining the location of a moving object in which the SAW sensor is attached relative to the interrogator unit 100 or some other desired source.

Figure 7:
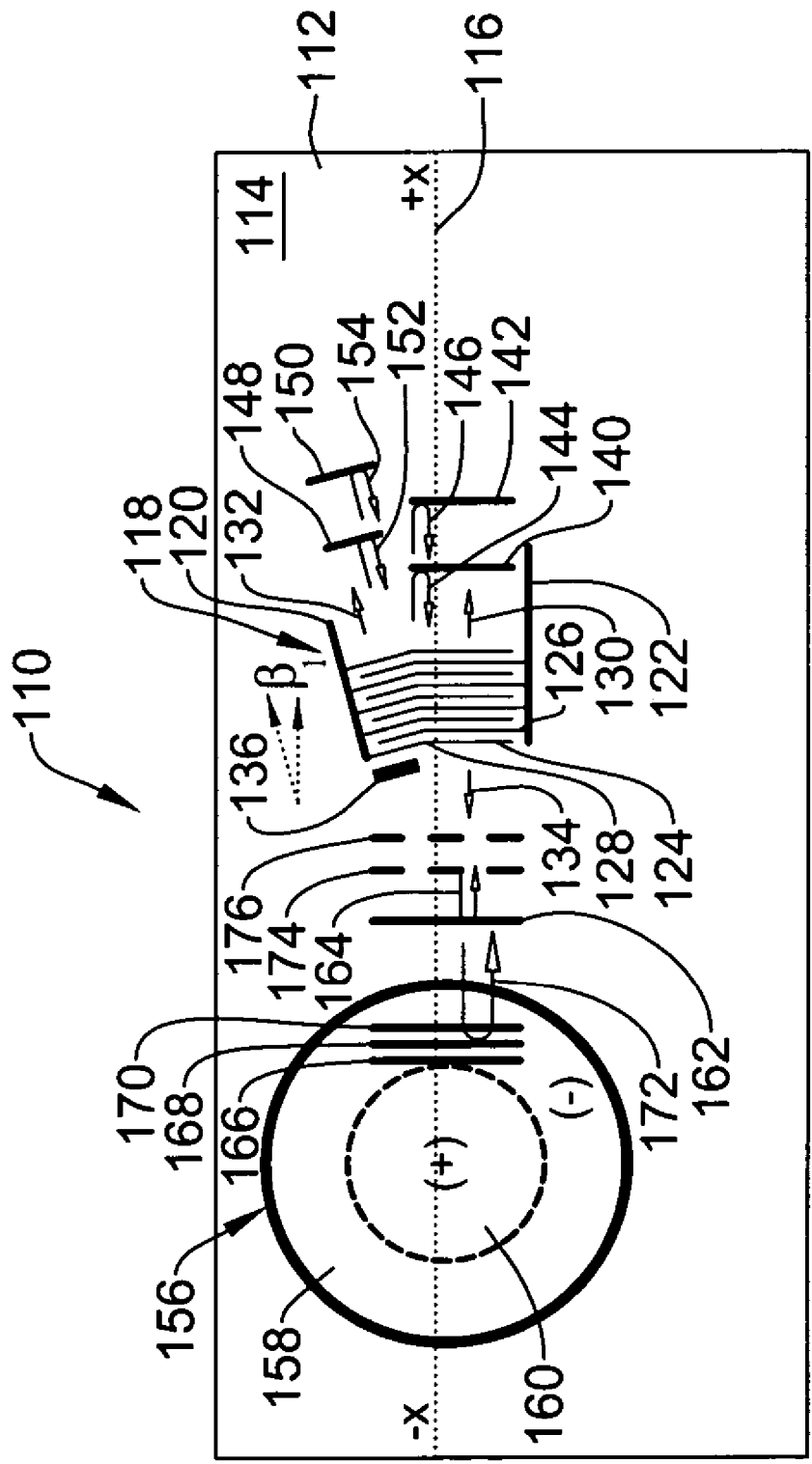
FIG. 7 is a top schematic view of a MEMS SAW sensor in accordance with another illustrative embodiment of the present invention employing a single SAW delay line.

FIG. 7 is a top schematic view of a MEMS SAW sensor 110 in accordance with another illustrative embodiment of the present invention employing a single SAW delay line. SAW sensor 110 can be configured similar to SAW sensor 10 described above, including an underlying substrate 112 having a top surface 114 adapted to support a number of components that can be used to determine both the temperature and pressure of the surrounding environment along a single SAW delay line 116.

An IDT 118 can be provided above the top surface 114 of the substrate 112 to generate two surface acoustic waves that propagate bi-directionally in both a +x direction and a −x direction along the SAW delay line 116. In the illustrative embodiment of FIG. 6, the IDT 118 can include two offset combs 120,122 each having a number of respective metal electrodes 124,126 that are interspaced with each other. A bent portion 128 of each electrode 124,126 can be configured to orient a portion of each electrode 124,126 at an angle $\beta_1$ away from +x direction of the SAW delay line 116. Such non-linear orientation of the electrodes 124,126 can be configured to simultaneously produce a first incident surface acoustic wave 130 in the +x direction parallel with the SAW delay line 116, and a second incident surface acoustic wave 132 in the +x direction disposed at angle $\beta_1$ to the first incident surface acoustic wave 130. This orientation of the first incident surface acoustic wave 130 to the second incident surface acoustic wave 132 results from the fact that surface acoustic waves are normally transmitted in a direction orthogonal to the electrodes 124,126.

In similar fashion, and as further shown in FIG. 7, the electrodes 124,126 can be configured to produce a first incident surface acoustic wave 134 in the −x direction parallel with the SAW delay line 116, and a second incident surface acoustic wave (not shown) in the −x direction at angle $\beta_1$ to the first surface acoustic wave 134. An absorbing layer or substance 136 can be provided adjacent the inclined portion of the electrodes 124,126 to prevent the second (i.e. offset) incident surface acoustic wave from being transmitted in the −x direction, thereby eliminating any interference that may result from the combination of the two incident surface acoustic waves 134 along the −x direction of the SAW delay line 116.

To measure temperature within the surrounding environment, a number of temperature reflectors may be formed on a stress-free region of the top surface 114. In the illustrative embodiment of FIG. 7, a first and second temperature sensing reflector 140,142 are shown positioned lengthwise in a direction orthogonal to the SAW delay line 116, and can be configured to reflect a respective echo signal 144,146 having a phase response affected only by the phase velocity and its temperature coefficient in the +x direction of the SAW sensor 110. A third and fourth temperature sensing reflector 148,150 each oriented lengthwise at an angle $\beta_1$ to the SAW delay line 116, in turn, can be configured to reflect a respective echo signal 152,154 each having different temperature coefficients of phase velocity and reflection coefficients with respect to echo signals returned from reflectors 140 and 142. As with other embodiments described herein, the temperature can be measured differentially using a phase response function that is a linear combination of the differences of phase response between the different echo signals 144,146,152,154 returned by the temperature sensing reflectors 140,142,148,150.

The detection and measurement of pressure within the surrounding environment can be accomplished in a manner similar to that described above. An etched diaphragm 156 having a compressive region 158 and a stretched region 160 can be configured to displace in response to external pressure within the surrounding environment. A reference pressure reflector 162 oriented lengthwise in a direction orthogonal to the SAW delay line 116 and disposed on a stress-free region of the top surface 114 can be provided as a referenced phase response for the pressure measurement, producing an echo signal 164 having a phase response affected by the phase velocity and the temperature coefficient of the reflector 164 in the −x direction of the SAW sensor 110.

A number of pressure sensing reflectors 166,168,170 located on the compressive region 158 of the diaphragm 156, in turn, can be provided to measure pressure within the surrounding environment adjacent the diaphragm 156, similar to that described above with respect to FIG. 1. As the first surface acoustic wave 134 wave transmitted by the IDT 118 is deflected against the pressure sensing reflectors 166,168, 170, a number of echo signals 172 are produced, each having a phase velocity representative of the sign (i.e. + or −) and strain on the diaphragm 156. A measure of the pressure can then be determined by differentially combining the phase responses of the different pressure sensing reflectors 166, 168,170 exposed to different strains together with the phase response of the pressure reference reflector 162. If desired, a number of identifier reflectors 174,176 provided above the top surface 114 and in acoustic communication with the SAW delay line 116 can be configured to function as tagging means for uniquely identifying the SAW sensor 110.

As with the illustrative embodiment described above with respect to FIG. 3, a simplified structure of a MEMS SAW sensor having a minimized number of reflectors could be employed for differentially measuring both temperature and pressure, if desired. In certain embodiments, for example, reflectors 146, 154, 162, and 168, and 170 can be eliminated from the top surface 114 of the substrate 112, leaving thereon reflector 148 for temperature measurement, reflector 166 for pressure measurement, and reference reflector 140 for both temperature and pressure measurement, if properly positioned as discussed above.

Figure 8:
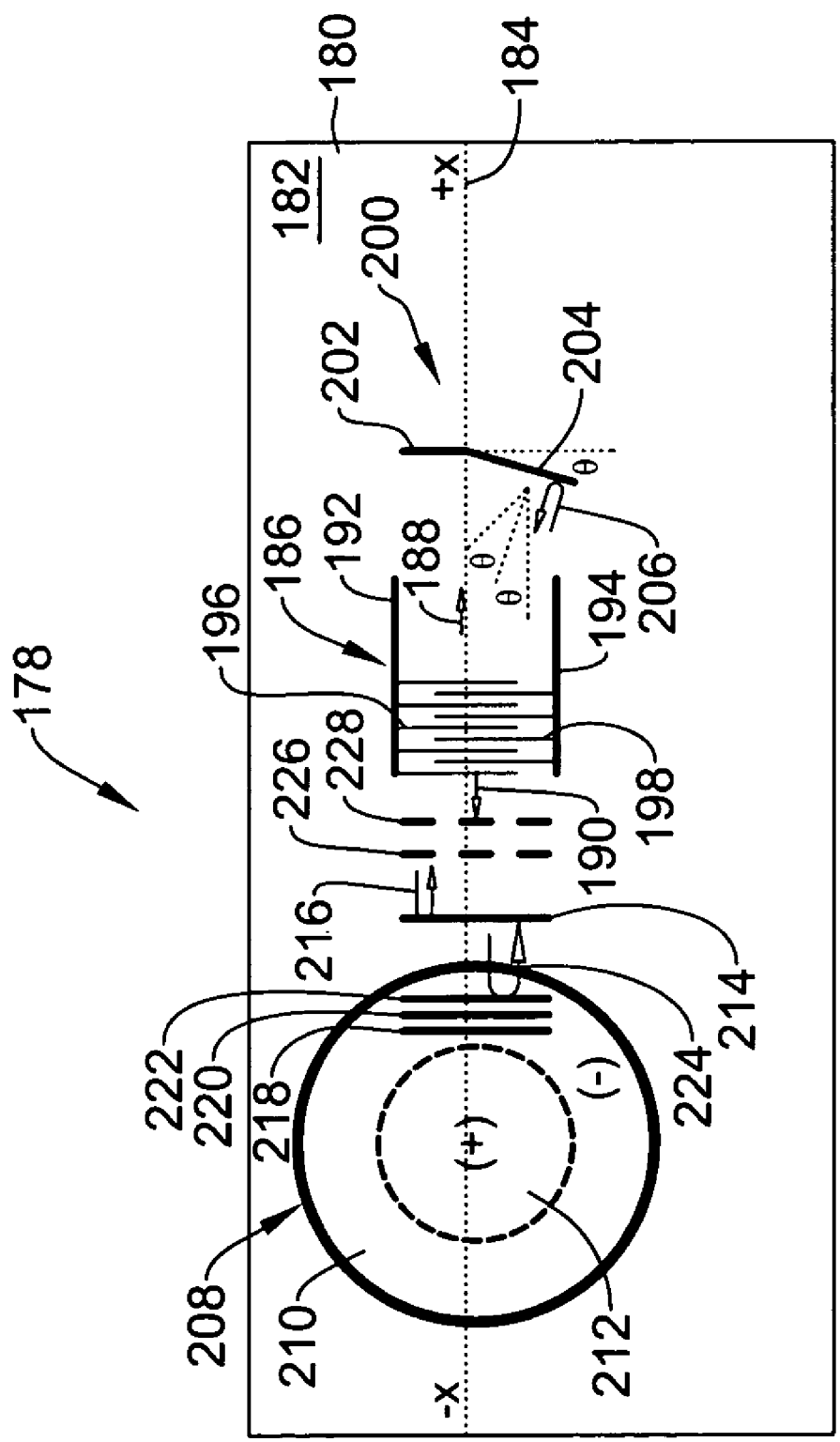
FIG. 8 is a top schematic view of a MEMS SAW sensor in accordance with another illustrative embodiment of the present invention employing a single SAW delay line.

FIG. 8 is a top schematic view of a MEMS SAW sensor 178 in accordance with another illustrative embodiment of the present invention employing a single SAW delay line. SAW sensor 178 can be configured similar to SAW sensor 10 described above, including an underlying piezoelectric substrate 180 having a top surface 182 adapted to support a number of components that can be used to determine both the temperature and pressure of the surrounding environment along a single SAW delay line 184.

A uniform IDT 186 can be provided above the top surface 182 of the substrate 180 to generate two surface acoustic waves 188,190 that propagate bi-directionally in both a +x direction and the −x direction along the SAW delay line 184. In the illustrative embodiment of FIG. 8, the IDT 186 can include two parallel combs 192,194 each containing, respectively, a first number of linear electrodes 196 and a second number of linear electrodes 198 interspaced with respect to each other and oriented lengthwise in a direction orthogonal to the SAW delay line 184.

In the illustrative embodiment of FIG. 8, a single temperature sensing reflector 200 can be provided adjacent to the IDT 186 along the +x direction of the SAW delay line 184. The temperature sensing reflector 200 can include a first portion 202 oriented lengthwise in a direction orthogonal to the SAW delay line 184, and a second portion 204 oriented lengthwise at an angle θ away from the first portion 202. The angle θ at which the second portion 204 of the temperature sensing reflector 200 is oriented away from the first portion 202 thereof may vary depending on the type of substrate material employed, and can be configured to produce an echo signal 206 that travels in a direction with a different temperature coefficient of phase velocity and reflection coefficient sufficient to measure temperature in a different manner.

As the first incidence surface acoustic wave 188 is transmitted from the IDT 186, it is reflected against two portions 202 and 204 of the temperature sensing reflector 200, forming two echo waves disposed at an angle of 2θ with respect to each other. The two portions 202,204, as a result, cause a phase shift in the echo signal 206 reflected from portion 204 back to the IDT 186 with respect to the echo signal reflected from portion 202 back to the IDT 186. As with other embodiments described herein, a measure of the temperature can then be obtained differentially using a phase response function that is linear combination of the differences of phase response between the echo signal received back from the first portion 202 of the temperature sensing reflector 200 and the second portion 204 thereof. By employing a single temperature sensing reflector 200 in the illustrative embodiment of FIG. 8, the overall area of the SAW sensor 178 can be reduced in comparison to other configurations employing multiple temperature sensing reflectors. Such reduction in size may be significant in those applications where space is a limited, or where a reduction in the number of components is desirable.

The detection and measurement of pressure within the surrounding environment can be accomplished using an etched diaphragm 208 having a compressive region 210 and a stretched region 212 that can be configured to displace in response to external pressure within the surrounding environment. A reference pressure reflector 214 oriented lengthwise in a direction orthogonal to the SAW delay line 184 and provided on a stress-free region of the top surface 182 can be provided as a referenced phase response for the pressure measurement, producing an echo signal 216 having a phase response affected only by the phase velocity, the temperature coefficient of the phase velocity, and the relative position of the reflector 214 to the IDT 186 in the −x direction.

A number of pressure sensing reflectors 218,220,222 located on the compressive region 210 of the diaphragm 208, in turn, can be configured to produce a number of echo signals 224 that can be used to measure pressure within the surrounding environment adjacent the diaphragm 208, similar to that described above with respect to FIG. 1. If desired, a number of identifier reflectors 226,228 provided above the top surface 182 and in acoustic communication with the SAW delay line 184 can be configured to function as tagging means for uniquely identifying the SAW sensor 178.

Figure 9:
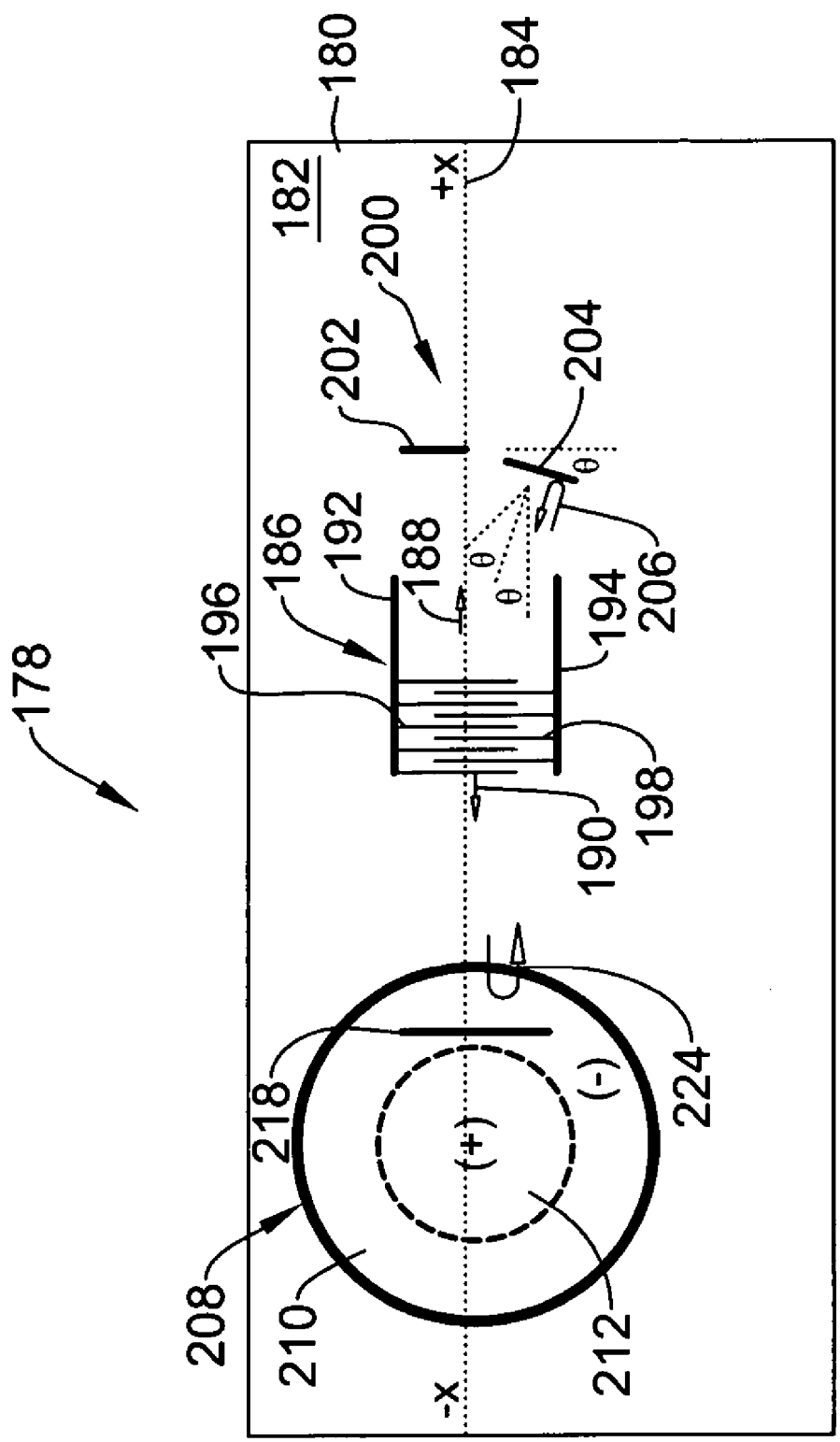
FIG. 9 is a top schematic view showing the illustrative MEMS SAW sensor of FIG. 8 employing a minimum number of reflectors for differentially measuring temperature and pressure.

To prevent any possible interference of the echo signals reflected from the two portions 202,204 of the reflector 202, and to reduce the size of the SAW chip size and complexity of the associated interrogation electronics, the SAW sensor 178 may employ a minimum number reflectors in a manner similar to that described above with respect to FIG. 3. As shown in FIG. 9, for example, reflectors 220, 222, 226, and 228 are shown removed from the top surface 182 of the substrate 180, leaving thereon a minimum number of reflectors 202,204, and 218 to permit both differential temperature and pressure measurements.

In the illustrative embodiment of FIG. 9, portion 202 of reflector 200 can be configured to act as a reference reflector for both temperature and pressure differential measurement. The two portions 202,204 of the reflector 200 can be physically separated from each other to reduce the possibility that waves reflected against the reflector 200 will interfere with each other as they are returned back to the IDT 186. In contrast to the illustrative embodiment of FIG. 8, the reflector 218 located on the compressive region 210 of the diaphragm 208 can be provided as the sole reflector along the −x direction of the SAW delay line to sense pressure. In use, differential pressure measurement can be accomplished by measuring the difference of the phase response of reflectors 202 and 218. Differential temperature measurement, in turn, can be accomplished by measuring the difference of phase response of reflector portions 202 and 204.

Figure 10:
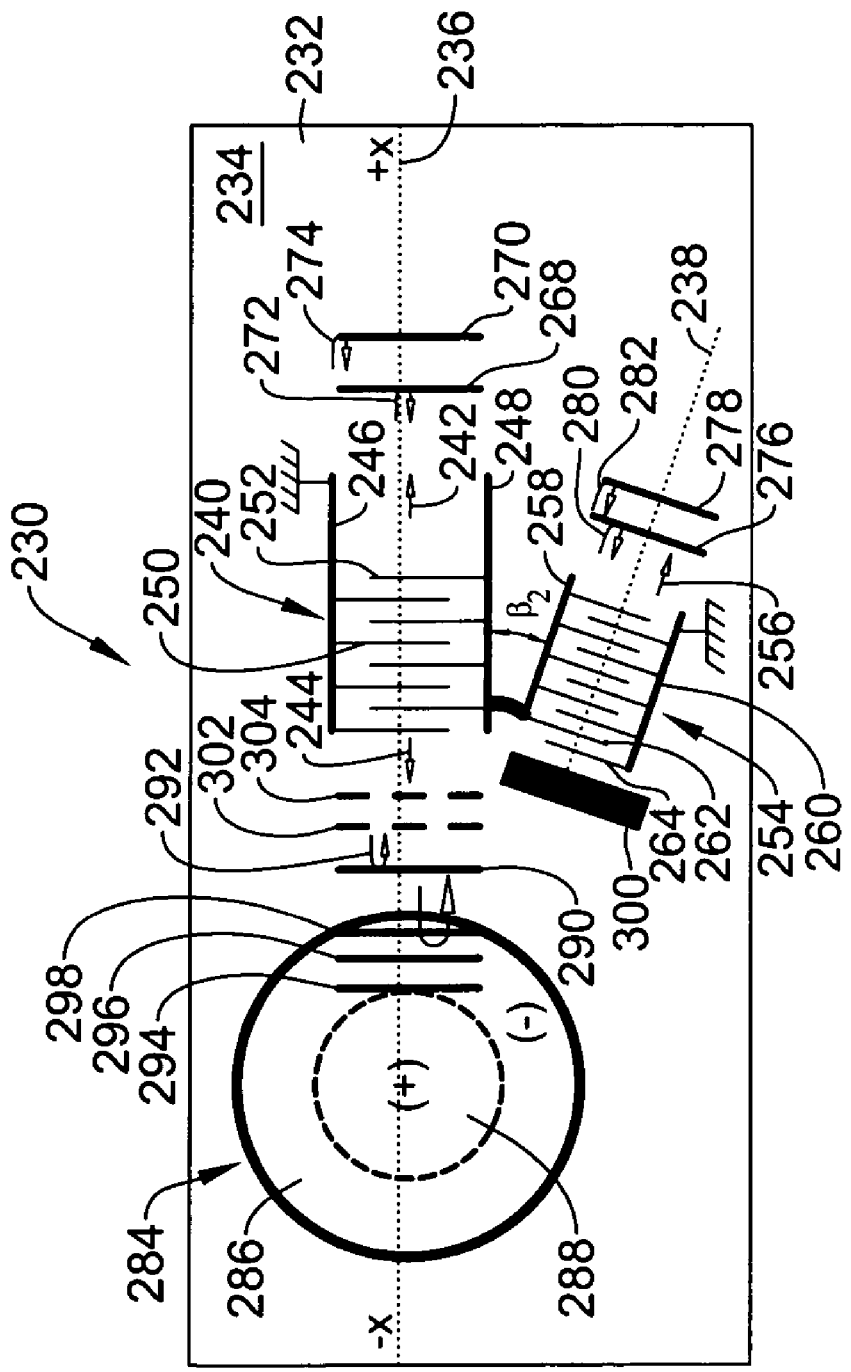
FIG. 10 is a top schematic view of a MEMS SAW sensor in accordance with an illustrative embodiment of the present invention employing two SAW delay lines.

FIG. 10 is a top schematic view of a MEMS SAW sensor 230 in accordance with another illustrative embodiment of the present invention employing two SAW delay lines. SAW sensor 230 can include an underlying piezoelectric substrate 232 having a top surface 234 adapted to support a number of components that can be used to determine temperature and pressure within the surrounding environment using a first SAW delay line 236 and a second SAW delay line 238, which can both be connected in parallel with respect to the electrical signal received from the sensor antenna.

A first IDT 240 of the SAW sensor 230 can be provided above the top surface 234 of the substrate 232 to generate two separate surface acoustic waves 242,244 that propagate bi-directionally in both the +x direction and −x direction along the first SAW delay line 236. In the illustrative embodiment of FIG. 10, the first IDT 240 can include two parallel combs 246,248 containing, respectively, a first number of linear metal electrodes 250 and a second number of linear metal electrodes 252 interspaced with each other and oriented lengthwise in a direction orthogonal to the first SAW delay line 236.

A second IDT 254 of the SAW sensor 230 can be provided above the top surface 234 of the substrate 232 to generate a surface acoustic wave 256 that propagates in the general direction of the second SAW delay line 238. The second IDT 254 can include two parallel combs 258,260 containing, respectively, a third number of linear metal electrodes 262 and a fourth number of linear metal electrodes 264 interspaced with each other and oriented lengthwise in a direction orthogonal to the second SAW delay line 238.

As can be further seen in FIG. 10, the first and second IDT's 240,254 can be offset from each other at an angle $\beta_2$, offsetting the second SAW delay line 236 from the first SAW delay line 238. The IDT's 240,254 can be electrically coupled in parallel to each other such that excitation of first IDT 240 occurs concurrently with the second IDT 254. In the illustrative embodiment of FIG. 10, for example, comb 258 of the second IDT 254 can be electrically coupled to comb 248 of the first IDT 240 via an electric wire or trace. The opposing combs 246, 260 of the first and second IDT's 240,254, in turn, can be provided at ground or virtual ground, if desired.

The IDT's 240,254 can be configured to transmit surface acoustic waves 242,244,256 along the first SAW delay line 236 and the second SAW delay line 238 in a direction that permits the transmission of the RF response signal at different times in order to avoid echo signal interference. In certain embodiments, for example, factors such as the line width and spacing of the interdigitated electrodes and/or the position of reflectors with respect to the IDT can be altered to vary the operational frequencies and propagation characteristics of the surface acoustic waves for each of the IDT's 240,254, causing the reflected echo signals to return at different times. Other factors such as the number of electrodes coupled to each IDT 240,254 can also be altered to vary the propagation characteristics of the surface acoustic waves.

To measure temperature within the surrounding environment, a first and second temperature sensing reflector 268, 270 positioned lengthwise in a direction orthogonal to the first SAW delay line 236 can be provided on a stress-free region of the top surface 234, and can be configured to reflect a respective echo signal 272,274 having a phase response affected only by the phase velocity, the temperature coefficient of the reflectors 268,270, and the relative distance from the reflectors 268,270 to the IDT 240 in the +x direction. A third and fourth temperature reflector 276,278 positioned lengthwise in a direction orthogonal to the second SAW delay line 238, in turn, can be configured to reflect a respective echo signal 280,282 that can be used for temperature measurement, wherein a different temperature coefficient of phase velocity and reflection coefficient is obtained. As with other embodiments herein, the temperature can then be measured differentially using a phase response function that is a linear combination of the differences in phase response between the different echo signals 272,274,280,282 returned by the temperature sensing reflectors 268,270,276,278. As with the orientation of the temperature reflectors 68,70,72 described above with respect to FIG. 1, the angle $\beta_2$ at which the second SAW delay line 238 is oriented away from the first SAW delay line 236 can be varied to adjust the sensitivity of the temperature system, as desired.

The detection and measurement of pressure within the surrounding environment can be accomplished using an etched diaphragm 284 having a compressive region 286 and a stretched region 288 that can be configured displace in response to external pressure within the surrounding environment. A reference pressure reflector 290 oriented lengthwise in a direction orthogonal to the first SAW delay 236 and positioned on a stress-free region of the top surface 234 can be provided as a referenced phase response for the pressure measurement, producing an echo signal 292 having a phase response affected only by the phase velocity, the temperature coefficient of the phase velocity, and the relative distance from the reflector 290 to IDT 254 in the −x direction.

A number of pressure sensing reflectors 294,296,298 located on the compressive region 286 of the diaphragm 284 can be provided to measure pressure within the surrounding environment adjacent the diaphragm 284. An absorption layer or substance 300 can be provided adjacent the second IDT 254 to prevent the surface acoustic waves emitted from the second IDT 254 from interfering with the surface acoustic waves emitted by the first IDT 240. If desired, a number of identifier reflectors 302,304 provided above the top surface 234 and in acoustic communication with the first SAW delay line located along line 236 can be configured to function as tagging means for uniquely identifying the SAW sensor 230.

Figure 11:
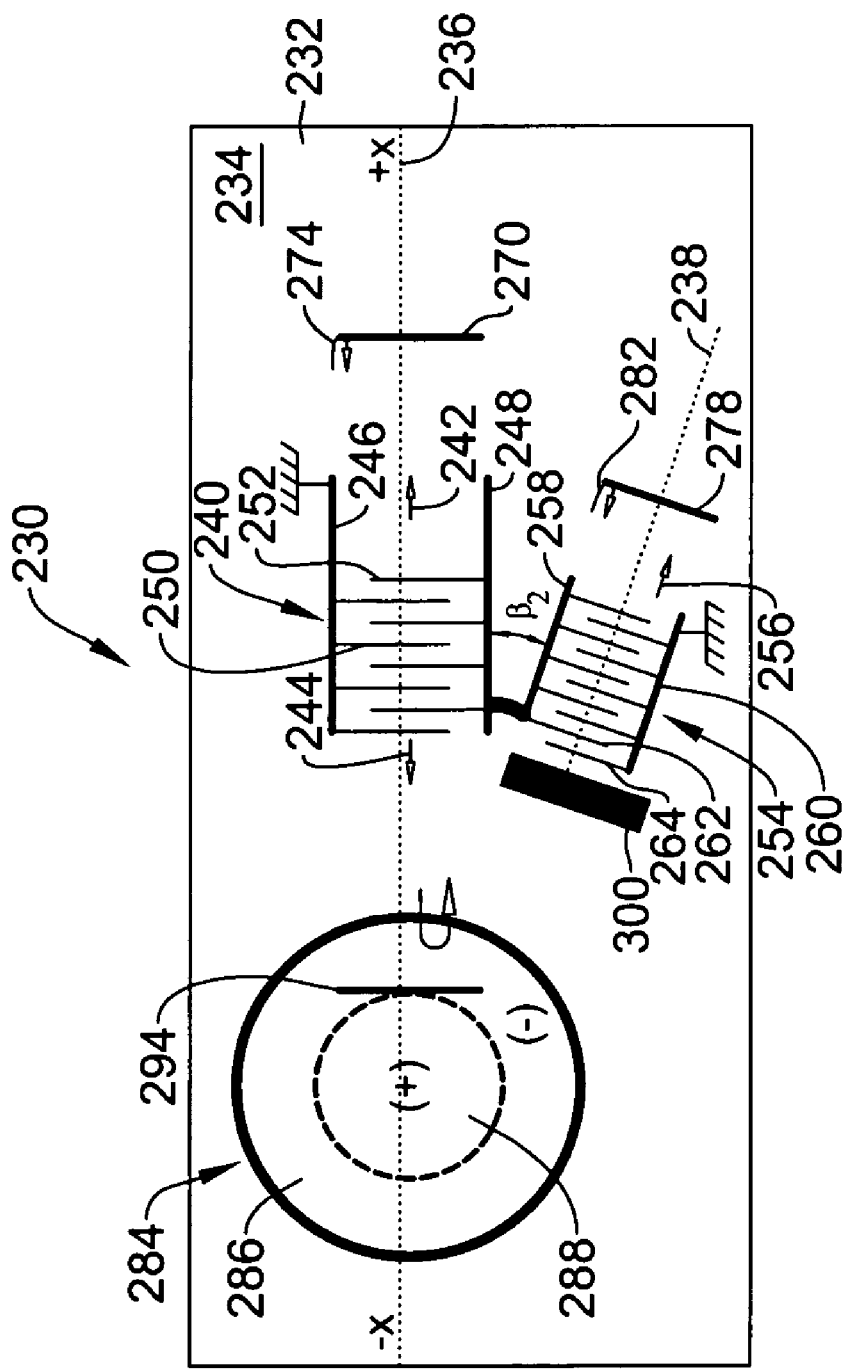
FIG. 11 is a top schematic view showing the illustrative MEMS SAW sensor of FIG. 10 employing a minimum number of reflectors for differentially measuring temperature and pressure.

As with other embodiments, herein, the SAW sensor 230 may employ a minimum number of reflectors to permit differential pressure and temperature measurement. As shown in FIG. 11, for example, reflectors 268, 276, 290, 296, 298, 302, and 304 can be removed from the top surface 234 of the substrate 232, leaving reflectors 270, 278, and 294 thereon. For differential temperature measurement, the difference in the phase response from the signal reflected by each of the reflectors 270 and 278 can be determined. In addition, for differential pressure measurement, the difference in the phase response from the signal reflected by each of the reflectors 270 and 294 can be determined.

Having thus described the several embodiments of the present invention, those of skill in the art will readily appreciate that other embodiments may be made and used which fall within the scope of the claims attached hereto. Numerous advantages of the invention covered by this document have been set forth in the foregoing description.

It will be understood that this disclosure is, in many respects, only illustrative. Changes may be made in details, particularly in matters of shape, size and arrangement of parts without exceeding the scope of the invention.

What is claimed is:

1. A SAW sensor for sensing temperature and pressure within an environment, comprising:
   an electrode structure that transmits and receives surface acoustic waves along a SAW delay line of the sensor;
   temperature sensing means for sensing temperature within the environment, said temperature sensing means structured to reflect surface acoustic waves transmitted along a first direction of the SAW delay line; and
   pressure sensing means for sensing pressure within the environment, said pressure sensing means structured to reflect surface acoustic waves transmitted along a second direction of the SAW delay line;
   wherein the first and second directions are relative to the same SAW delay line.

2. The SAW sensor of claim 1, wherein said electrode structure includes at least one interdigital transducer.

3. The SAW sensor of claim 2, wherein each of said at least one interdigital transducer is coupled to the top surface of a piezoelectric substrate.

4. The SAW sensor of claim 2, wherein said at least one interdigital transducer comprises a single interdigital transducer.

5. The SAW sensor of claim 4, wherein the single interdigital transducer includes a plurality of linear electrodes that transmit and receive surface acoustic waves bidirectionally along the SAW delay line.

6. The SAW sensor of claim 5, wherein said temperature sensing means includes one or more temperature sensing reflectors.

7. The SAW sensor of claim 6, wherein each of the one or more temperature sensing reflectors are oriented lengthwise in a direction orthogonal to the SAW delay line.

8. The SAW sensor of claim 6, wherein each of the one or more temperature sensing reflectors are oriented lengthwise at an angle to the SAW delay line.

9. The SAW sensor of claim 6, wherein said one or more temperature sensing reflectors comprise three temperature sensing reflectors.

10. The SAW sensor of claim 6, wherein said one or more temperature sensing reflectors comprises a single temperature sensing reflector.

11. The SAW sensor of claim 6, wherein said one or more temperature sensing reflectors comprises a single temperature sensing reflector having a first portion oriented in a direction orthogonal to the SAW delay line, and a second portion oriented at an angle relative to the first portion.

12. The SAW sensor of claim 11, wherein said first portion of the single temperature sensing reflector is physically separated from said second portion.

13. The SAW sensor of claim 4, wherein the single interdigital transducer includes a plurality of non-linear electrodes adapted to transmit and receive surface acoustic waves in a first direction parallel to the SAW delay line, and in a second direction oriented at an angle relative to the first direction.

14. The SAW sensor of claim 13, wherein said temperature sensing means includes a first number of temperature sensing reflectors oriented lengthwise in a direction orthogonal to first direction, and a second number of temperature sensing reflectors oriented lengthwise in a direction orthogonal to the second direction.

15. The SAW sensor of claim 2, wherein said at least one interdigital transducer includes a first interdigital transducer adapted to transmit and receive surface acoustic waves along a first SAW delay line, and a second interdigital transducer adapted to transmit and receive surface acoustic waves along a second SAW delay line oriented at an angle to the first SAW delay line.

16. The SAW sensor of claim 1, wherein said temperature sensing means includes one or more temperature reference reflectors in acoustic communication with the SAW delay line.

17. The SAW sensor of claim 1, wherein said pressure sensing means includes a diaphragm having a compressive zone and a stretched zone.

18. The SAW sensor of claim 17, further including one or more pressure sensing reflectors disposed on the compressive zone of the diaphragm.

19. The SAW sensor of claim 18, wherein said one or more pressure sensing reflectors comprises three pressure sensing reflectors.

20. The SAW sensor of claim 18, wherein said one or more pressure sensing reflectors comprises a single pressure sensing reflector.

21. The SAW sensor of claim 1, wherein said pressure sensing means includes one or more reference pressure reflectors in acoustic communication with the SAW delay line.

22. The SAW sensor of claim 21, wherein said one or more reference pressure reflectors comprises a single temperature reference reflector of said temperature sensing means.

23. The SAW sensor of claim 1, further including an absorbing layer or substance positioned adjacent to the electrode structure.

24. The SAW sensor of claim 1, further including tagging means for uniquely identifying the SAW sensor.

25. The SAW sensor of claim 24, wherein said tagging means for uniquely identifying the SAW sensor includes one or more identification reflectors in acoustic communication with the SAW delay line.

26. The SAW sensor of claim 1, further including an electrical interrogator unit for transmitting and receiving RF signals to and from the SAW sensor.

27. The SAW sensor of claim 1, wherein the SAW sensor is passive.

28. The SAW sensor of claim 1, where the SAW sensor is wireless.

29. A SAW sensor for sensing temperature and pressure within an environment, comprising:
   a piezoelectric substrate having a top surface;
   an interdigital transducer coupled to the top surface of the substrate, said interdigital transducer structured to transmit and receive surface acoustic waves along a SAW delay line of the sensor;
   one or more temperature sensing reflectors structured to reflect surface acoustic waves transmitted along a first direction of the SAW delay line;
   a diaphragm having a compressive zone and a stretched zone; and
   one or more pressure sensing reflectors disposed on the compressive zone of the diaphragm and adapted to reflect surface acoustic waves transmitted along a second direction of the SAW delay line.

30. The SAW sensor of claim 29, wherein the interdigital transducer comprises a single interdigital transducer.

31. The SAW sensor of claim 30, wherein the single interdigital transducer includes a plurality of linear electrodes that transmit and receive surface acoustic waves bidirectionally along the SAW delay line.

32. The SAW sensor of claim 30, wherein each of the one or more temperature sensing reflectors are oriented lengthwise in a direction orthogonal to the SAW delay line.

33. The SAW sensor of claim 30, wherein each of the one or more temperature sensing reflectors are oriented lengthwise at an angle to the SAW delay line.

34. The SAW sensor of claim 30, wherein said one or more temperature sensing reflectors comprises three temperature sensing reflectors.

35. The SAW sensor of claim 30, wherein said one or more temperature sensing reflectors comprises a single temperature sensing reflector having a first portion oriented orthogonally to the SAW delay line, and a second portion oriented at an angle relative to the first portion.

36. The SAW sensor of claim 35, wherein said first portion of the single temperature sensing reflector is physically separated from said second portion.

37. The SAW sensor of claim 30, wherein the single interdigital transducer includes a plurality of non-linear electrodes that transmit and receive surface acoustic waves in a first direction parallel to the SAW delay line, and in a second direction oriented at an angle relative to the first direction.

38. The SAW sensor of claim 37, wherein said one or more temperature sensing reflectors includes a first number of temperature sensing reflectors oriented lengthwise in a direction orthogonal to the first direction, and a second number of temperature sensing reflectors oriented lengthwise in a direction orthogonal to the second direction.

39. The SAW sensor of claim 29, wherein said at least one interdigital transducer includes a first interdigital transducer that transmits and receives surface acoustic waves along a first SAW delay line, and a second interdigital transducer that transmits and receives surface acoustic waves along a second SAW delay line oriented at an angle from the first SAW delay line.

40. The SAW sensor of claim 29, further including one or more temperature reference reflectors in acoustic communication with the SAW delay line.

41. The SAW sensor of claim 29, wherein said one or more pressure sensing reflectors comprises three pressure sensing reflectors.

42. The SAW sensor of claim 29, wherein said one or more pressure sensing reflectors comprises a single pressure sensing reflector.

43. The SAW sensor of claim 29, further including one or more pressure reference reflectors in acoustic communication with the SAW delay line.

44. The SAW sensor of claim 29, further comprising a single reference reflector that provides a referenced phase response for both temperature and pressure measurement of the SAW sensor.

45. The SAW sensor of claim 29, further including an absorbing layer or substance positioned adjacent the interdigital transducer.

46. The SAW sensor of claim 29, further including tagging means for uniquely identifying the SAW sensor.

47. The SAW sensor of claim 46, wherein said tagging means for uniquely identifying the SAW sensor includes one or more identification reflectors in acoustic communication with the SAW delay line.

48. The SAW sensor of claim 29, further including an electrical interrogator unit for transmitting and receiving RF signals to and from the SAW sensor.

49. The SAW sensor of claim 29, wherein the SAW sensor is passive.

50. The SAW sensor of claim 29, where the SAW sensor is wireless.

51. A SAW sensor for sensing temperature and pressure within an environment, comprising:
an electrode structure that transmits and receives surface acoustic waves along a SAW delay line of the sensor;
a single temperature sensing reflector that reflects surface acoustic waves transmitted along a first direction of the SAW delay line;
a diaphragm having a compressive zone and a stretched zone;
a single pressure sensing reflector disposed on the compressive zone of the diaphragm and that reflects surface acoustic waves transmitted along a second direction of the SAW delay line; and
a single reference reflector that provides a referenced phase response for both temperature and pressure measurement of the SAW sensor.

52. A SAW sensor for sensing temperature and pressure within an environment, comprising:
an interdigital transducer that transmits and receives surface acoustic waves along a SAW delay line of the sensor;
temperature sensing means for sensing temperature within the environment, said temperature sensing means structured to reflect surface acoustic waves transmitted along a first direction of the SAW delay line;
pressure sensing means for sensing pressure within the environment, said pressure sensing means structured to reflect surface acoustic waves transmitted along a second direction of the SAW delay line;
wherein the first and second directions are relative to the same SAW delay line;
means for wirelessly receiving a power signal to power the SAW sensor; and
means for wirelessly transmitting an RF response signal from the SAW sensor.

53. A sensor system for acoustically sensing temperature and pressure within an environment, comprising: a SAW sensor including an electrode structure that transmits and receives surface acoustic waves along a SAW delay line, said SAW sensor including temperature sensing means for measuring temperature along a first direction of the SAW delay line and pressure sensing means for measuring pressure along a second direction of the SAW delay line; wherein the first and second directions are relative to the same SAW delay line;
means for wirelessly providing power to the SAW sensor; and
means for wirelessly transmitting an RF response signal from the SAW sensor.

54. The sensor system of claim 53, wherein said means for wirelessly providing power to the SAW sensor includes an electrical interrogator unit.

55. The sensor system of claim 53, wherein said means for wirelessly transmitting an RF response signal from the SAW sensor includes an antenna.

56. A method of wirelessly and passively measuring temperature and pressure within an environment, comprising the steps of:
providing a SAW sensor including an electrode structure that transmits and receives surface acoustic waves along a SAW delay line having a +x direction and a −x direction;

wirelessly powering the electrode structure and transmitting incident surface acoustic waves in both the +x direction and −x direction of the SAW delay line;

providing one or more temperature sensing reflectors in acoustic communication with the +x direction of the SAW delay line, said one or more temperature reflectors structured to reflect echo signals back to the electrode structure;

providing a diaphragm and one or more pressure sensing reflectors in acoustic communication with the −x direction of the SAW delay line, said one or more pressure sensing reflectors structured to reflect echo signals back to the electrode structure;

outputting a wireless RF response signal; and analyzing the RF response signal to obtain a measure of the temperature and pressure within the environment.

57. The method of claim 56, wherein said step wirelessly powering the electrode structure is accomplished with an electrical interrogator unit.

58. The method of claim 56, wherein said step of outputting a wireless RF response signal is accomplished with an antenna operatively coupled to the SAW sensor.

59. The method of claim 56, wherein said step of analyzing the RF response signal outputted by the SAW sensor to obtain a measure of temperature and pressure is accomplished with a controller or processor.

* * * * *